Nov. 7, 1939.   J. W. MacCLATCHIE   2,178,876
VALVE
Filed May 28, 1937
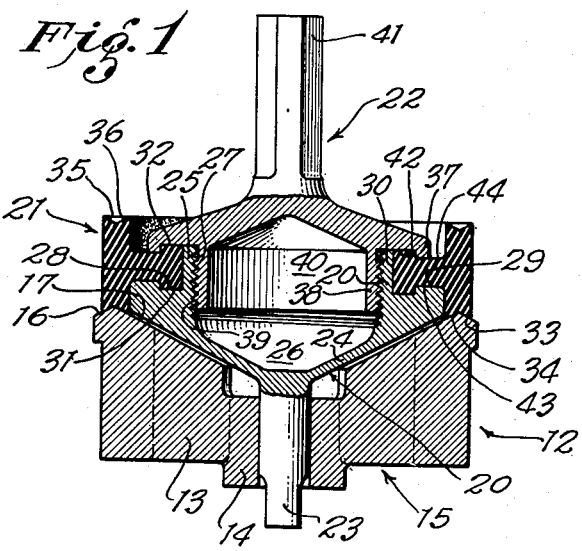
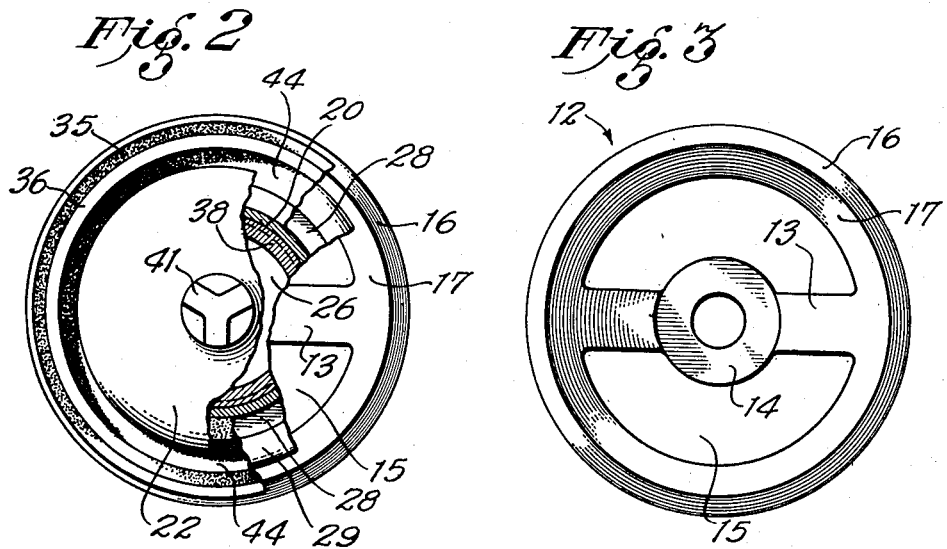
JOHN W. MacCLATCHIE,
INVENTOR.
BY Robert M. McManigal
ATTORNEY Patented Nov. 7, 1939

2,178,876

UNITED STATES PATENT OFFICE 2,178,876

VALVE

John W. MacClatchie, Newhall, Calif., assignor to MacClatchie Manufacturing Company of California, Compton, Calif., a corporation of California Application May 28, 1937, Serial No. 145,252

4 Claims. (Cl. 251—127)

My invention relates to valves such as are used in slush pumps and the like, and of the type disclosed in my Patent No. 1,785,278 and in Hickerson Patent No. 1,785,259.

An object of my invention is to provide a valve which when seated insures a tight seal between the valve and the valve seat at all times.

Another object of my invention is to provide a valve in which a minimum of the material pumped will be caught between the valve and the valve seat, thereby providing a valve which will withstand considerable usage.

Another object of my invention is to provide a valve which is light in construction, so that the valve may be seated with a minimum of "pounding" action.

Another object of my invention is to provide a valve which is provided with an air chamber which is sealed off, so that no fluid, mud or other material can get into the air chamber.

Another object of my invention is to provide a valve with an air chamber in which the air chamber is automatically sealed off when the valve is assembled.

My invention has many other objects, advantages, and features, some of which, with the foregoing, will be set forth at length in the following description where I shall outline a form of the invention, which I have selected for illustration in the drawing accompanying and forming a part of the present specification. In the said drawing, I have shown one form of my invention, but it is to be understood that I do not limit myself to such form, since the invention, as expressed in the claims, may be embodied in a large plurality of forms.

Referring to the drawing:

Figure 1 is an elevational sectional view of the valve, partly broken away.

Figure 2 is a plan view of the valve, partly broken away.

Figure 3 is a plan view of the valve seat.

The seat for the valve may be mounted in a usual exhaust or intake port in the valve chest of a pump structure as shown in Figure 1 of the above mentioned Hickerson patent, the bore of the port preferably tapering slightly so that the valve seat may be readily fixed therein.

The valve seat is somewhat similar to the valve seat shown and described in my above mentioned patent. The valve seat is made of a wear resisting material, such as a suitable metal. The valve seat may comprise an annulus 12 adapted for reception in the bore of the valve chest and formed with ribs 13 which extend toward the center of the annulus where they terminate in an axial guide bearing 14. The ribs 13 are suitably circumferentially spaced to permit passage of a fluid through the bore 15 of the valve seat and therefore may comprise one pair of ribs as shown in Figure 3.

In order to provide a valve seat in which a minimum of material will be caught between the valve and the valve seat, the seating surface of the annulus 12 is preferably provided with a ridge formed by the intersection of two faces 16 and 17 which faces are preferably at a substantial angle to each other, and may be in the form of an inverted V.

The faces 16 and 17 of the annulus 12 and the upper surface of the ribs 13 form a seating surface for the valve, and this seating surface preferably tapers downwardly from the upper end of the face 17 of the annulus 12 to the outer periphery of the guide bearing 14 as shown in Figure 1.

As stated above, one of the features of my invention is that it provides a valve with an air chamber which is sealed off so that no material can get into the air chamber. As an example of this arrangement, the valve may consist of a valve body 20, a packing insert 21 and a valve cap 22. The valve body 20 and the valve cap 22 may be of wear resisting material such as a suitable metal. The valve body 20 is provided with a depending axial guide rod 23 which is adapted for sliding engagement in the guide bearing 14 and the lower side of the valve body 20 is provided with a tapering seating surface 24 which is adapted to engage the seating surface formed by a part of face 17 and the ribs 13. The valve body 20 is also provided with a hub 25, the inner part of which is hollow as indicated by the numeral 26, and the upper outer part of which is provided with threads 27. The valve body 20 is also provided with an annular groove 28 and an annular shoulder 29.

The packing insert 21 may be of any suitable resilient material such as rubber and may be in the form of an annular disc. The packing insert is provided with a bore 30 annular shoulders 31 and 32, annular grooves 43 and 44, and seating surfaces 33, 34, 35, and 36. The packing insert is adapted to be mounted on the valve body 20 with the inner edges of the packing insert abutting the outer edge of the hub 25, the shoulder 31 of the insert extending into the annular groove 28 of the valve body, and either seating surfaces 33 and 34 or seating surfaces 35 and 36 in operative position. The seating surfaces 33 and 35, and 34 and 36, are of such shape that they are adapted to tightly fit against the faces 16 and 17 respectively of the valve seat.

The valve cap 22 is provided with an annular flange 37, an annular groove 42 and a hub 38, the outside of which is threaded as at 39, and the inside of which is hollow as indicated by the numeral 40. The valve cap is also provided with a fluted stem 41.

As the valve cap 22 is tightly threaded into the valve body 20, the annular flange 37 of the valve engages the upper groove 44 of the packing 21 and clamps the packing insert between the shoulder 42 of the cap 22 and the shoulder 29 of the valve body 20, and thereby tightly seals off the air chamber which is formed by the hollow portions indicated by the numerals 26 and 40. Mud, liquid, or other material is thereby prevented from entering the air chamber, even at the high pressures at which the valve is adapted to operate.

It will readily be seen that due to the shape of the valve seat and the valve, a minimum of mud or other material will be caught between the valve and the valve seat when the valve is closed. This is due in part to the fact that the material on the valve seat has less distance to travel in order to drop off the valve seat than in conventional valves. The relatively steep angle of the faces 16 and 17 greatly contributes to the improved operation and wear resisting qualities of my valve. The seating surfaces 33 and 34 are similar to the seating surfaces 35 and 36 respectively, so that either pair of said surfaces is adapted to be placed in operative position, and therefore the packing insert 21 may be reversed when one of said surfaces becomes worn.

The valve is so constructed that when the valve is closed, the seating surfaces 33 and 34 of the packing insert 21 engage the seating faces 16 and 17 at least by the time, and preferably just slightly before, the seating surface 24 of the valve body engages the seating surface of the ribs 13 and the inner portion of the face 17. As the seating surfaces 33 and 34 engage the faces 16 and 17 the pressure of the rubber against the faces causes the periphery of the packing insert to be compressed and thereby insures a tight seal.

The valve is provided with an air chamber between the valve cap 22 and the valve body 20, and the valve is made as light as possible in order to reduce the "pounding" action on the valve seat when the valve is closing and thereby reduces the distortion on the seating faces of the valve and the valve seat, and in order to effect a quicker closing action of the valve by means of the conventional spring. The advantage of a quicker closing action is that the slippage of the mud is reduced, resulting in a more efficient pump.

From the foregoing description taken in connection with the accompanying drawing, advantages of the construction and method of operation will be readily understood by those skilled in the art to which the invention appertains, and while I have described the principle of operation, together with the form which I now consider to be the best embodiment thereof, I desire to have it understood that the articles shown are merely illustrative, and that the invention is not to be limited to the details disclosed herein but is to be accorded the full scope of the appended claims.

I claim:

1. A valve comprising a valve cap including an annular flange, an annular groove, and a threaded hub, the inside of said hub being hollow, a valve body including an annular flange, an annular groove and a threaded hub, the inside of said hub being hollow, and a packing insert adapted to be mounted between said valve cap and said valve body, said packing insert having oppositely disposed shoulders adapted to extend into the grooves of said valve cap and valve body and oppositely disposed grooves into which the annular flange of said valve cap and valve body are adapted to extend when said valve is assembled, said valve cap and said valve body being adapted to be screwed together when said packing insert is mounted in position, and form an air chamber between said valve cap and said valve body, and said packing insert sealing off said air chamber when said valve cap and valve body are tightly screwed together.

2. A valve adapted for operation with fluids under high pressures, said valve embodying a valve body having a hollow portion, said valve body providing an annular valve seat engaging surface of wear resisting material and being formed with an annular flange therearound, a valve cap having a hollow portion and being formed with an annular flange therearound, said valve cap being removably secured to said valve body with the hollow portions of the valve and body together forming a completely closed air chamber within the valve of a large volume relative to the valve displacement, an annular flexible material packing member clamped between the body flange and the cap flange in position around the valve over and sealing the connecting joint between the valve body and cap to seal-off the air chamber within the valve against passage of fluid under high pressure into said chamber, and said flexible material packing member being extended beyond said body flange and providing a sealing surface for engaging a valve seat in cooperative relation with the wear resisting material seat engaging surface of the valve body.

3. A valve for slush pumps and the like adapted for operation with fluids at high pressures, said valve embodying a valve body formed with an annular flange and a hub portion, said valve body and hub portion being hollow and the body providing an annular valve seat engaging surface of wear resisting material, a valve cap formed with an annular flange and a hub portion, said cap and hub portion being hollow and the cap being removably secured to the valve body with said hub portions joined together in concentric relationship and with said hollow cap and body together forming a completely closed air chamber within the valve of large volume relative to the valve displacement, and an annular packing member clamped between the annular flanges of the valve body and cap and being disposed around said hub portions over and sealing the joint there-between to seal-off the air chamber within the valve from passage of fluid under high pressure thereinto, said packing insert being extended radially beyond said flanges to form an annular seal around the valve for engaging a valve seat in cooperative relation with said annular wear resisting material valve seat engaging surface of the valve body.

4. A valve for slush pumps and the like adapted for operation with fluids at high pressures, said valve embodying a body providing a valve seat engaging surface of wear resisting material, and a valve cap secured to said valve body, said body and cap being formed to provide a completely closed air chamber within the valve of large volume relative to the valve displacement when the body and cap are removably secured together in valve forming relation, and a flexible material packing member secured in position around the valve over and sealing the connecting joint between the valve body and cap to thereby seal-off said air chamber within the valve from passage of fluid under high pressure thereinto, and said packing member providing a sealing surface adapted to engage a valve seat in cooperative relation with the wear resisting valve seat engaging surface of said valve body.

JOHN W. MacCLATCHIE.